(12) United States Patent
Anderson et al.

(10) Patent No.: US 7,181,693 B1
(45) Date of Patent: Feb. 20, 2007

(54) AFFECTIVE CONTROL OF INFORMATION SYSTEMS

(75) Inventors: Glen John Anderson, Sioux City, IA (US); Russell F. McKnight, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/528,254

(22) Filed: Mar. 17, 2000

(51) Int. Cl.
  *G06G 5/00* (2006.01)
(52) U.S. Cl. ...................... 715/745; 715/780
(58) Field of Classification Search ........... 345/701, 345/702, 703, 708, 710, 714, 745, 743, 863; 704/273, 272, 1, 270; 382/117, 173; 713/100, 713/47; 715/811, 745, 789, 861, 780, 744, 715/746–747, 765, 767, 768, 703, 708, 84; 380/252
See application file for complete search history.

(56) References Cited

U.S. PATENT DOCUMENTS

| | | | |
|---|---|---|---|
| 4,625,732 A | | 12/1986 | Kasa et al. |
| 4,931,865 A | | 6/1990 | Scarampi |
| 5,550,968 A | * | 8/1996 | Miller et al. ............... 345/743 |
| 5,579,238 A | | 11/1996 | Krugman |
| 5,666,503 A | * | 9/1997 | Campanelli et al. ........ 715/853 |
| 5,802,220 A | * | 9/1998 | Black et al. ................. 382/276 |
| 5,828,372 A | * | 10/1998 | Kameda ..................... 345/745 |
| 5,982,357 A | | 11/1999 | Burgett |
| 5,995,026 A | | 11/1999 | Sellers |
| 6,029,195 A | * | 2/2000 | Herz .......................... 709/219 |
| 6,185,534 B1 | * | 2/2001 | Breese et al. ............... 704/270 |
| 6,190,314 B1 | * | 2/2001 | Ark et al. .................... 600/300 |
| 6,212,502 B1 | * | 4/2001 | Ball et al. .................... 704/270 |
| 6,256,650 B1 | * | 7/2001 | Cedar et al. ................ 715/517 |
| 6,260,035 B1 | * | 7/2001 | Horvitz et al. ............... 706/60 |
| 6,275,806 B1 | * | 8/2001 | Pertrushin ................... 704/272 |
| 6,343,349 B1 | * | 1/2002 | Braun et al. ................ 711/154 |
| 6,404,438 B1 | * | 6/2002 | Hatlelid et al. ............ 345/473 |
| 6,427,137 B2 | * | 7/2002 | Petrushin .................... 704/273 |
| 6,463,415 B2 | * | 10/2002 | St. John ...................... 704/273 |
| 6,539,100 B1 | * | 3/2003 | Amir et al. ................. 382/117 |
| 6,629,242 B2 | * | 9/2003 | Kamiya et al. ............. 713/100 |
| 6,710,764 B1 | * | 3/2004 | Burgel et al. .............. 345/156 |
| 6,717,572 B1 | * | 4/2004 | Chou et al. ................. 345/157 |
| 6,728,680 B1 | * | 4/2004 | Aaron et al. ................ 704/271 |

(Continued)

OTHER PUBLICATIONS

Picard, Rosalind W. "Teaching Computers to Recognize and Express Emotion" in: Stork, David G. (ed.) "Hal's Legacy: 2001's Computer as Dream and Reality" (Cambridge, MA. MIT Press 1997), Chapter 13, Sec. 4.

(Continued)

*Primary Examiner*—Steven P Sax
(74) *Attorney, Agent, or Firm*—Jeffrey A. Proehl; Woods Fuller Shultz & Smith PC (57) ABSTRACT

An information system that determines the apparent emotional state of the user and, based upon that determination, reacts appropriately. Appropriate reactions of the system include marking user text input to convey the apparent emotional state of the user to recipients. Other embodiments incorporate reactions of the system that warn or prompt a user, prior to system execution of a user directed operation, when the system has determined that the apparent emotional state of the user merits a warning or a prompt.

31 Claims, 4 Drawing Sheets

U.S. PATENT DOCUMENTS

| | | | |
|---|---|---|---|
| 6,728,682 B2* | 4/2004 | Fasciano | 704/278 |
| 6,757,905 B1* | 6/2004 | Friedman et al. | 719/320 |
| 6,850,252 B1* | 2/2005 | Hoffberg | 715/716 |
| 2005/0027702 A1* | 2/2005 | Jensen et al. | 707/3 |

OTHER PUBLICATIONS

Pentland, A. and Choudhury, T. "Face Recognition for Smart Environments", COMPUTER, Feb. 2000, pp. 50-55.

* cited by examiner

AFFECTIVE CONTROL OF INFORMATION SYSTEMS

BACKGROUND OF THE INVENTION

1. Field of the Invention

This invention relates generally to control of data processing or information systems, and in particular to control of such systems based in part upon the detected apparent affective or emotional state of a user.

2. Description of the Related Art

In the history of human interaction with information systems, system reaction to the user actively engaged with the system generally has been based upon programmatic response to a user's intentional communicative acts, such as keyboard entry, mouse manipulation, voice input and the like. While certain information systems and applications respond to forms of information from a user that are not intentional communicative acts by the user, such as autonomic conditions in medical monitoring systems or biometric parameters for user identification in security systems, these system responses are generally not within the context of active engagement of the user with the system.

Yet for humans actively engaged with each other, an individual's response to another involves considerably more than reacting to the mere intentional communicative acts of the parties. In particular, effective interaction with others requires perceiving and reacting to the apparent affective or emotional states of others as well as to their intentional communicative acts.

An information system capable of determining a user's apparent affective state would be capable of altering its behavior in response to that apparent state, resulting in more effective interaction with the user. For example, in applications such as email, when a user is in communication with other users, a user's rash emotional reaction in communication may result in the user's transmitting an undesirable message. The system in this example, then, having determined that the user's apparent emotional state is such that the user's communication may be a rash response, may prompt the user for confirmation prior to transmission. What is needed for more effective human interaction with information systems is for information systems to determine and react appropriately to the apparent affective or emotional state of humans with whom they are actively engaged.

In addition to human-computer interaction, humans also use information systems as intermediaries in communication with other humans, as in email and word processing applications. Because effective interaction with other humans requires conveying affective or emotional states, a number of means of conveying such states have been developed by convention for written communications. For example, a correspondent's typing in all capital letters may serve to convey to the recipient the same emotional state that yelling conveys in spoken communications. Additionally or in the alternative, special combinations of common characters may be typed by a correspondent to convey an emotional state to a recipient, such as the now familiar colon-right parenthesis combination :) used to convey happiness or humor. Acronyms typed by a correspondent and understood in common with the recipient can serve the same function, for example "LOL" (laughing out loud) and "ROTF" (rolling on the floor). Depending upon display capabilities of the information systems of correspondent and recipient, the correspondent may convey emotional or affective state to the recipient by typing keystrokes or using function keys to insert special characters (such as a smiley face ☺), to change a font to bold or italic or to underline for emphasis, or to color font in appropriate portions of text. To convey affective or emotional state in any of these and like conventions used in written communications, the correspondent must intentionally direct an input device, such as a keyboard or a mouse, to insert characters or mark text to convey the correspondent's emotional state. What is needed is for the correspondent's information system, without any intentional direction from the correspondent, to determine the apparent affective or emotional state of the correspondent and react by marking appropriate text in such a way that by convention conveys the emotional state of the correspondent to the recipient.

SUMMARY OF THE INVENTION

The present invention shows a way for information systems to determine the apparent emotional or affective state of a user engaged with the system and, further, for information systems, based upon such determination, to react accordingly.

It is an object of the present invention to provide means for information systems to determine the apparent emotional or affective state of a user. It is a further object of the present invention to enable information systems to make intelligent decisions in applications programs based upon a determined apparent emotional or affective state of a user. It is a further object of this invention, having determined the apparent emotional or affective state of a correspondent, to convey that apparent state in communications transmitted by the correspondent to one or more recipients.

BRIEF DESCRIPTION OF THE DRAWINGS

Other objects, advantages, features and characteristics of the present invention, as well as methods, operation and function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that changes may be made without departing from the spirit or scope of the invention. To avoid detail not necessary to enable those skilled in the art to practice the invention, the description may omit certain information known to those skilled in the art. The following description is, therefore, not to be taken in a limiting sense, and the scope of the invention is defined only by the appended claims.

Figure 1:
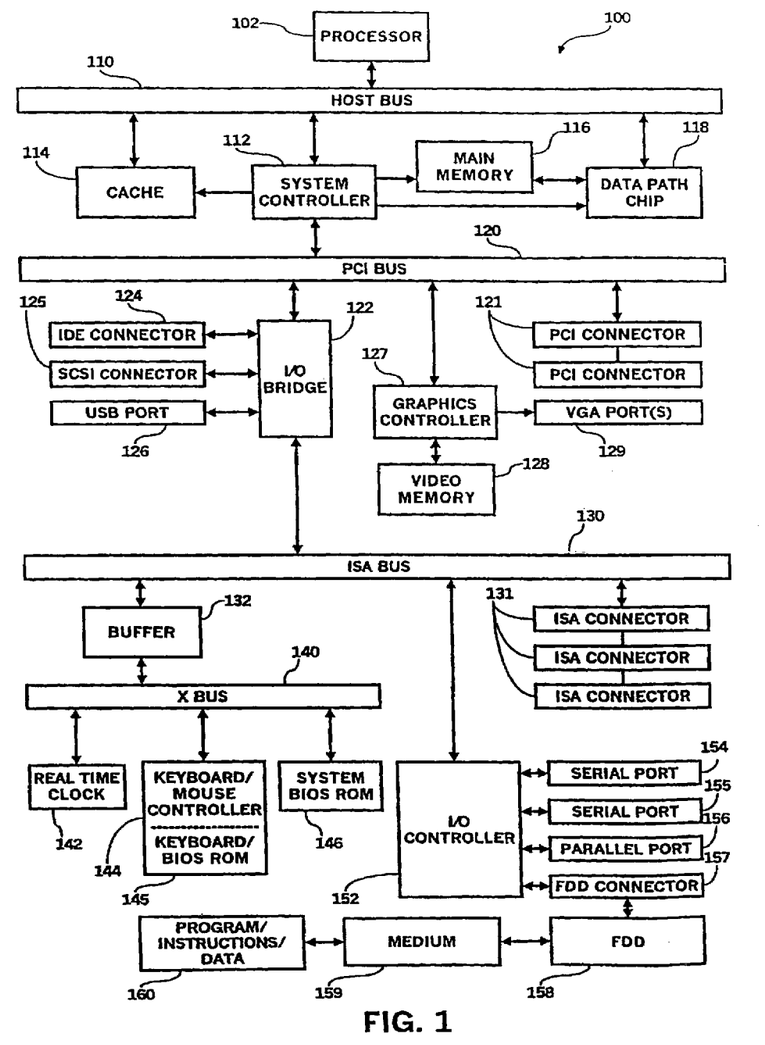
FIG. 1 is a block diagram of a general purpose information handling system, which may be used to implement the invention.

FIG. 1 shows a block diagram of an information handling system 100 in accordance with the present invention. In this embodiment, processor 102, system controller 112, cache 114, and data-path chip 118 are each coupled to host bus 110. Processor 102 is a microprocessor such as a 486-type chip, a Pentium®, Pentium II®, Pentium III®, or the like suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 112 (i.e. in the near future). Main memory 116 is coupled between system controller 112 and data-path chip 118, and in one embodiment, provides random-access memory of between 16 MB and 128 MB of data.

In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding these components and many of the other components shown in FIG. 1. Main memory 116 includes standard DRAM (Dynamic Random-Access Memory), EDO (Extended Data Out) DRAM, SDRAM (Synchronous DRAM), or the like suitable memory technology. System controller 112 controls PCI (Peripheral Component Interconnect) bus 120, a local bus for system 100 that provides a high-speed data path between processor 102 and various peripheral devices, such as video, disk, network, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121, each of which accepts a standard PCI card (not shown). In one embodiment, I/O bridge 122 and graphics controller 127 are each integrated on the motherboard along with system controller 112, in order to avoid a board-to-connector-to-board signal crossing interface, thereby providing better speed and reliability. In the embodiment shown, graphics controller 127 is coupled to a video memory 128 that includes memory such as DRAM, EDO DRAM, SDRAM, or VRAM (Video Random-Access Memory), and drives VGA (Video Graphics Adapter) port 129. VGA port 129 can connect to VGA-type or SVGA (Super VGA)-type displays or the like. Other input/output (I/O) cards having a PCI interface can be plugged into PCI connectors 121.

In one embodiment, I/O bridge 122 is a chip that provides connection and control to one or more independent IDE connectors 124, to one or more SCSI connectors 125, to one or more USB (Universal Serial Bus) ports 126, and to an ISA (Industry Standard Architecture) bus 130. In this embodiment, IDE connector 124 provides connectivity for up to two or more standard IDE-type devices, in particular those for non-volatile memory storage ano/or retrieval such as hard disk drives, CD-ROM (Compact Disk-Read-Only Memory) drives, DVD (Digital Video Disk or Digital Versatile Disk) drives, or TBU (Tape-Backup Unit) devices. As will be appreciated by those skilled in the art, client systems in a network, such as web pads, need not be equipped with any such non-volatile memory storage devices, relying instead upon the function of such devices in a server to which the client is connected.

In one similar embodiment, two IDE connectors 124 are provided, each providing an EIDE (Enhanced IDE) compliant architecture. In the embodiment shown, Small Computer System Interface (SCSI) connector 125 provides connectivity for preferably up to seven or fifteen SCSI-type devices depending on the version of SCSI supported by the respective embodiment. In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which data and/or program code 160 is stored.

In one such embodiment, program code 160 includes code that controls programmable system 100 to perform an application program as described in accordance with the invention. In an embodiment typical for client systems, and characteristic of "thin clients" such as web pads, serial port 154 is connectable to a computer network such as a local network or the Internet, and such network has program code 160 that controls programmable system 100 to act as a client, receiving and interpreting data sent by a matching server computer application. In another such embodiment characteristic of server systems, serial port 154 is connectable to a computer network such as a local network or the Internet, and special program code 160 within programmable system 100 executes that causes programmable system 100 to act as a server, providing data and applications over the network to a matching client computer program that is capable of properly interpreting that data and applications.

In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146. FIG. 1 shows one exemplary embodiment of the present invention, however other bus structures and memory arrangements are specifically contemplated. It should be appreciated that modification or reconfiguration of information handling system 100 of FIG. 1 by one having ordinary skill in the art would not depart from the scope or the spirit of the present invention.

An information system may determine the apparent affective or emotional state of a user based upon a variety of sources of information, which may be used singly or in combination for the information system to make its determination. See generally Picard, Rosalind W. "Teaching Computers to Recognize and Express Emotion" in: Stork, David G. (ed.), *Hal's Legacy: 2001's Computer as Dream and Reality* (Cambridge, Mass. MIT Press. 1997), Chapter 13, Section 4.

In applications where the user is inputting textual content, such as word processing or email composition, the actual content of the input may give a good indication of the user's affective state. For example, the incidence of vulgar language or derogatory epithets in text may indicate anger or frustration, with frequency of such words providing an indication of the intensity of the user's emotional state. By monitoring the incidence and frequency of words indicating a user's emotional state, an information system may make a determination of the user's apparent affective state.

As previously discussed in reference to the prior art, the user may mark textual input in such a way as to indicate the user's emotional or affective state with respect to the text or context in question. Such marking may be by way of highlighting the text in some way, such as alteration of font appearance by color, underlining, bold, italic, capitals, etc. In the alternative, such marking may be by way of special character combinations or special characters inserted in appropriate textual locations. In any case, the correspondent conveys his emotional state to the recipient by such marking on the assumption that the recipient shares the convention that associates that marking with the affective state of the correspondent. An information system may determine a correspondent's apparent emotional state by monitoring text input for markings that, by convention, convey emotion.

The facts surrounding the user's composition and transmission of text in such applications may be indicative of the user's affective state. For example, if the period of time between a user's first access of an email message and the user's reply to that message is very short, it is possible that the user has reacted emotionally to the received message and has responded rashly based upon that emotional response. Similarly, a rash response may be indicated if the length of time used to compose the message is very short but the recipient list of the message is very long or the recipients include key individuals such as the head of the sender's organization. An information system may, in such circumstances, make a determination of the user's apparent emotional state in the composition of email by monitoring the time to reply, the time to compose, and the distribution list of the email.

A user's input characteristics may also be indicative of the user's emotional state. For applications using standard manual input devices, pronounced force of keystrokes on a keyboard or mouse clicks on a mouse may indicate anger or frustration. Input devices such as keyboards and computer mice that are capable of detecting and reporting the degree of force in user input are well known in the art (see, for example, U.S. Pat. No. 5,579,238 to Krugman, U.S. Pat. No. 5,982,357 to Burgett and U.S. Pat. No. 5,995,026 to Sellers). By employing such input devices, an information system may determine apparent user affective state by monitoring the force exercised by the user in input operations.

A user's input characteristics may also be determined in applications using speech input by analysis of the user's speech. As set forth in the Hal 's Legacy reference, vocal intonation is a common way to communicate strong feelings. Several features of speech are modulated by emotion; we divide them into such categories as voice quality (e.g., breathy or resonant, depending on individual vocal tract and breathing), timing of utterance (e.g., speaking faster for fear, slower for disgust), and utterance pitch contour (e.g., showing greater frequency range and abruptness for anger, a smaller range and downward contours for sadness). Analysis of these characteristics in a user's speech by an information system provides the information system with an indication of the user's emotional state.

Autonomic responses are also indicative of a user's emotional state. While some autonomic responses may be difficult to monitor unobtrusively, galvanic skin response of a user's hands or fingers may be monitored by input devices such as keyboards or computer mice. Electrodes on such input devices at appropriate points of contact with the user's hands may be used by an operatively connected information system to monitor the user's skin conductivity. As is well known in the art (see, for example, Kasa et al., U.S. Pat. No. 4,625,732), increased skin conductivity is associated with a user's affective state. Monitoring the user's skin conductivity thereby provides the information system with an indication of the user's apparent emotional state.

Other autonomic responses that may be measured fairly unobtrusively are the dilation of the user's pupils and the rate at which the user blinks his eyes. It is well known in the art that pupil dilation and eye blink rate, just as skin conductivity, are associated with a person's affective state (see, for example, U.S. Pat. No. 4,931,865 to Scarampi). By means of an operatively coupled video camera, an information system may monitor a user's pupil dilation and/or blink rate and thereby make a determination of a user's apparent emotional state.

Face recognition software technology may also be employed by this invention. Typically analyzing a computer graphic of a face, such software, used in conjunction with a video camera operatively coupled with the information system, can determine the identity of the user and the user's apparent emotional state. At present, several algorithmic approaches to face recognition provide sufficiently accurate performance in face recognition for application in this invention. Some approaches are based upon eigenvectors generated from the autocorrelation matrix of a computer image of a face. These eigenvectors, termed "eigenfaces" by persons skilled in the art, may be analyzed by vector transform followed by discriminative modeling to yield reliable face recognition determinations. In such approaches, some algorithms employ a linear discriminant, while others, such as that used in the Viisage Gallery application of Viisage Technology, Inc. of Littleton, Mass., employ a quadratic discriminant. In the alternative, within these approaches using eigenfaces, some algorithms, such as those used in FaceIt® software by Visionics Corp. of Jersey City, N.J., may employ a sparse transform of the eigenfaces, followed by a discriminative neural network analysis.

Illustrating yet another approach, TrueFace software from Miros, Inc. of Wellesley, Mass., relies upon a method that extracts and analyzes local features from a variety of faces. Local features of a face are extracted from an eigenface by a determination of which features of a face differ most from features of other faces in a database. By applying neural network technology to the analysis of extracted local features in a database derived from computer images, this software improves its face recognition success rate with experience.

In any case, the present state of the art allows those of ordinary skill in the art, without undue experimentation or testing, to use face recognition software to analyze a user's facial expression and thereby determine the apparent emotional or affective state of the user.

Figure 2:
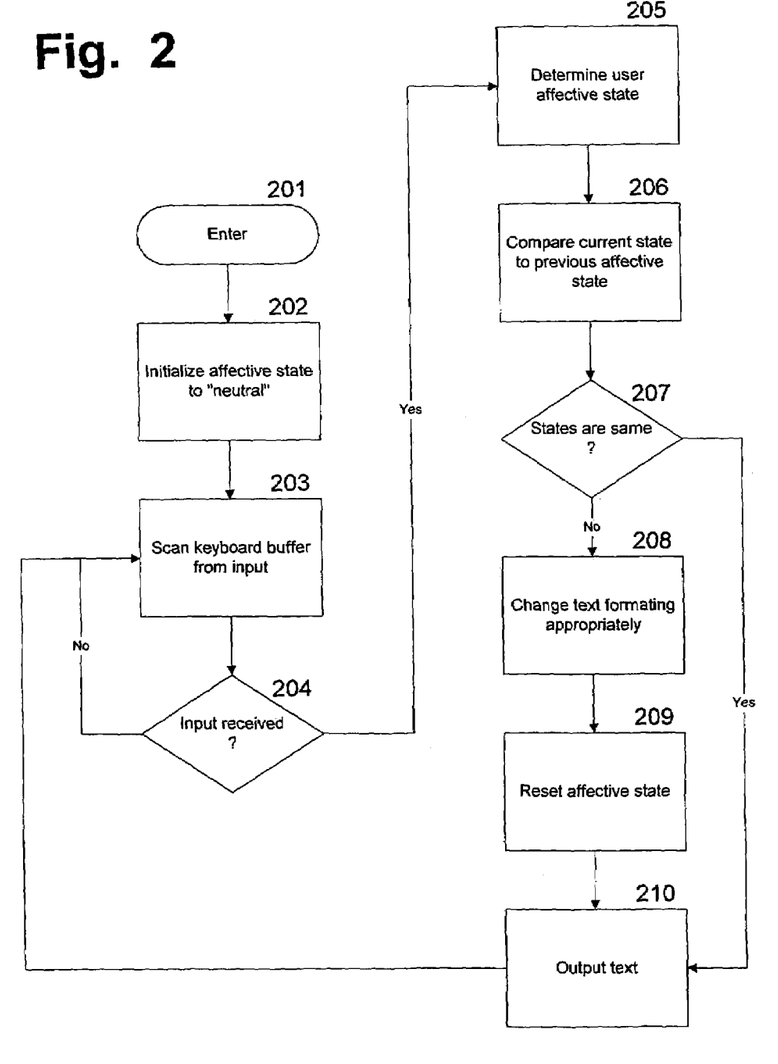
FIG. 2 is a flow chart of a process for applying a determination of apparent affective state to marking of text in a text composition application.

Turning now to the remaining drawings, FIG. 2 is a flow chart of a procedure for applying a determination of apparent affective state to marking of text in a keyboard text input and composition application. This procedure, which processes text input prior to formatted output, commences at 201. In 202, the user's previously determined affective state is initially set by default to "neutral". A loop commencing at 203 scans the keyboard for input. Upon obtaining keyboard input 204, the system proceeds to determine the user's apparent affective state 205, by way of means well known to those of ordinary skill in the art, as set forth by example above. Using, for example, the message content, input device force detection, autonomic indicators or facial expression, or any combination of methods well known to those of ordinary skill in the art to determine the user's apparent affective state at 205, the system compares the newly determined affective state to the previously determined affective state at 206. If these states are the same, the system proceeds to output text at 210 without a change in formatting.

Considering the initial condition of this aspect of the invention, the initial setting of text formatting by default corresponds with communicating a "neutral" affective state in this embodiment. Since the initial setting of the user's previously determined affective state is "neutral" at 202, if there is no difference between this initial state and the current affective state newly determined at 205, step 207 will cause the initial output of text that is appropriately marked "neutral" by default at 210. If, on the other hand, the current affective state differs from the initial setting of the user's previously determined affective state ("neutral" in this embodiment) step 207 will direct step 208 to change text formatting appropriately and the initial output of text will be appropriately marked at 210.

As set forth by example above, text formatting indicating emotional state may be indicated 208 by way of highlighting the text in some way, such as alteration of font appearance by color, underlining, bold, italic, capitals, etc. In the alternative, such marking may be by way of special character combinations or special characters inserted in appropriate textual locations. In any case, the information system will change text formatting at 208 in a manner well known in the art, marking the text in such a way as to be likely to convey the user's affective state to the intended recipient of the composition.

Subsequent to the initial condition, if the current affective state determined at 205 differs from the previous affective state (which is to say the user's apparent emotional state has changed), the system changes text formatting appropriately at 208 as described above. At 209 the variable indicating the user's present affective state is reset to indicate the current state as determined in step 205. Appropriately formatted text is output at 210. After this procedure has output text, it continues to scan the keyboard for input, monitoring the user's apparent affective state and modifying text markings as necessary and appropriate.

Figure 3:
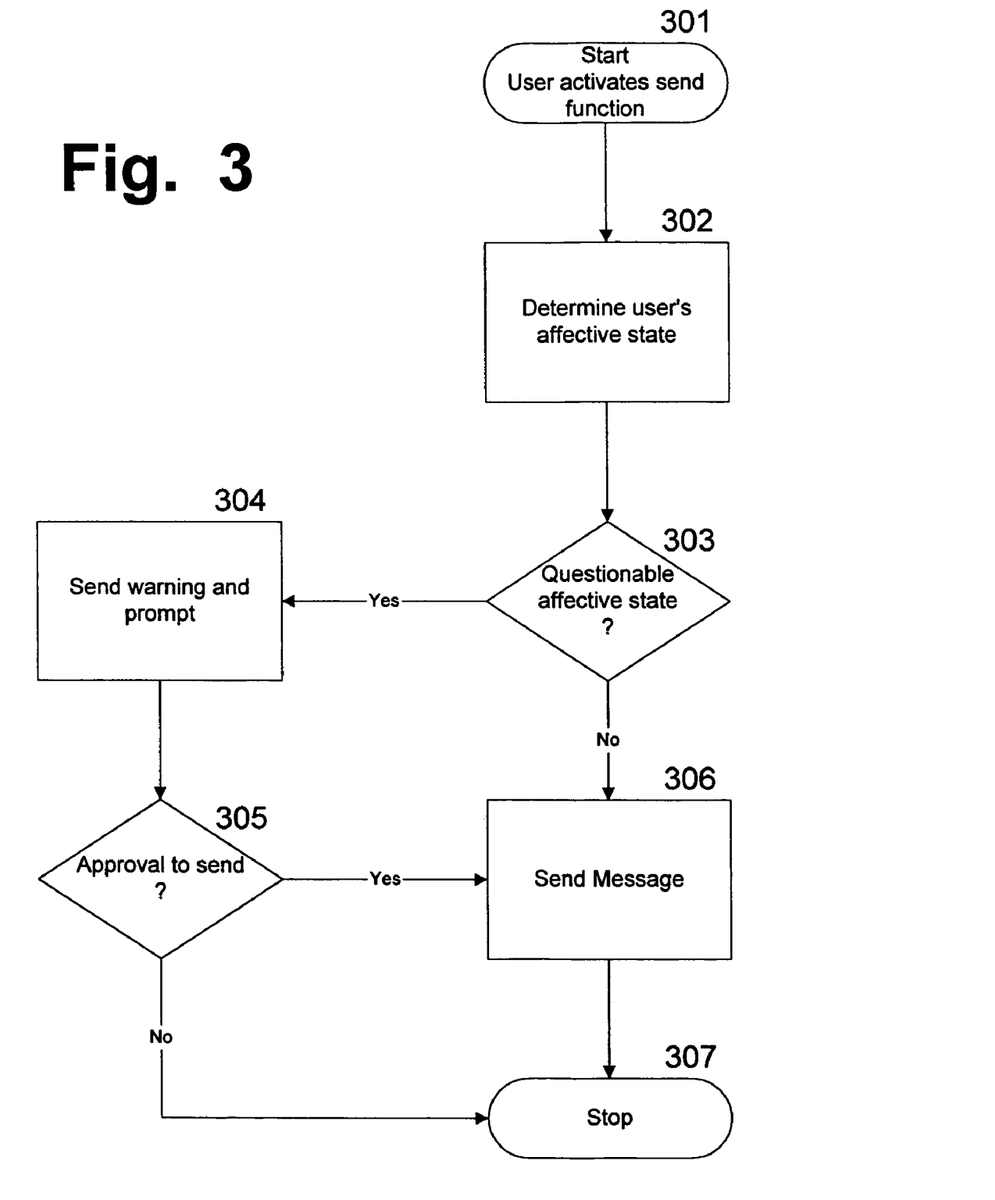
FIG. 3 is a flow chart of a process for applying a determination of apparent affective state in an interpersonal assistant application that warns a user of possible inadvisability of sending email.
Figure 4:
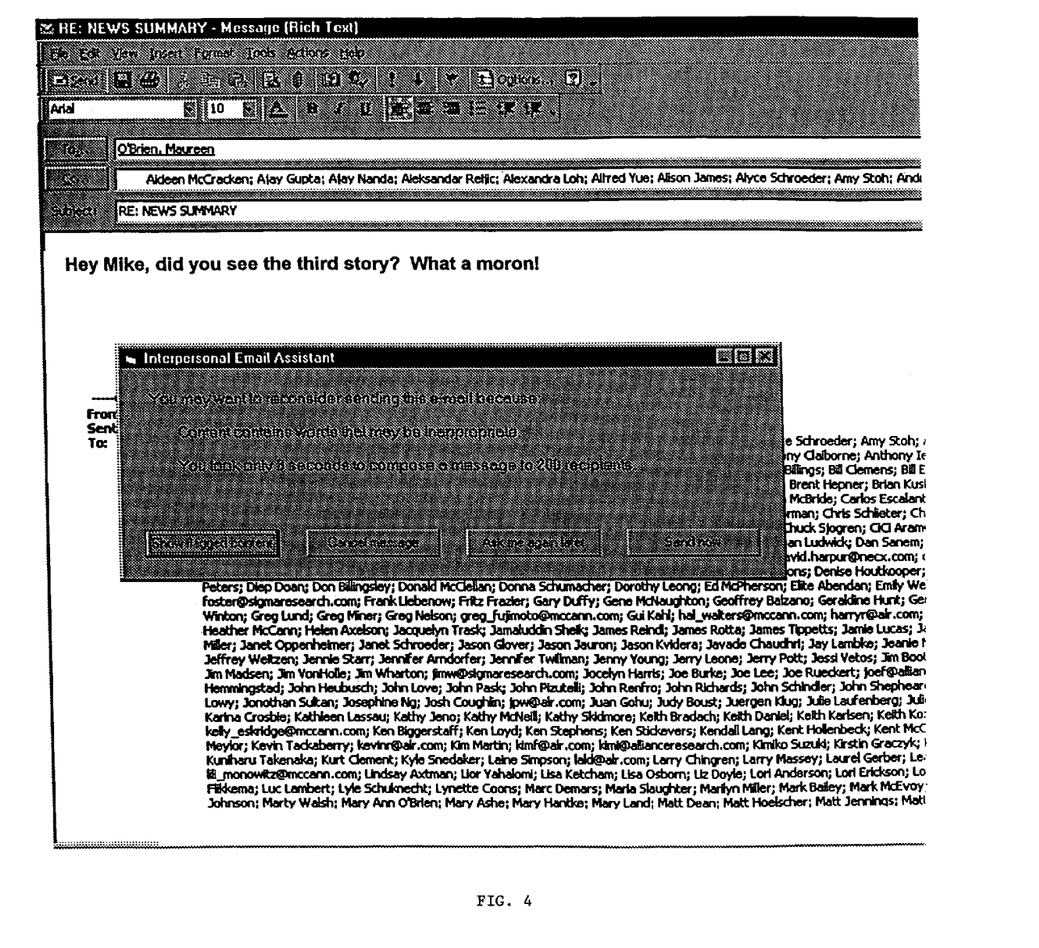
FIG. 4 is an exemplary warning output of the process shown in FIG. 3.

Referring next to FIG. 3, a flow chart is shown of a procedure for applying a determination of apparent affective state to prompting whether to transmit a user's electronic mail composition. This procedure, which is an application operating between the composition and the transmission of email, commences upon the user's activation 301 of a "send" function for email from the user directed to one or more recipients. The information system determines the user's apparent affective state at 302 by using, for example, the message content, input device force detection, autonomic indicators, facial expression, or any combination of such methods. In the alternative, or additionally, the information system may make its determination of the user's apparent affective state at 302 by facts surrounding the user's composition and transmission of text. As set forth above, such facts may include the period of time between a user's first access of an email message and the user's reply to that message, or the length of time used to compose the message related to the intended recipients of the message. In any case, the information system, by methods well known to those of ordinary skill in the art, makes a determination of the apparent affective state of the user at 302. If the apparent affective state of the user is such that the user would be well-advised to exercise particular prudence in transmission of email 303, the system will warn the user and prompt for confirmation at 304. FIG. 4 is illustrative of a typical warning and prompt, showing the circumstances leading the information system to determine that the user's affective state might be questionable. If and only if the user confirms the prompt 305, the email is transmitted at 306 and the program exits 307.

Although the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. An information system under affective control, comprising:
   an application program with which a user is actively engaged;
   means for determining the apparent affective state of the user;
   means for changing the output of the application program responsive to the apparent affective state of the user;
   wherein said application program comprises means of user input;
   wherein said user input is text; and
   wherein said means for changing the operation of the application program comprises means for changing the appearance of text input by the user if the apparent affective state of the user indicates that text output by the application program should be marked.

2. An information system under affective control as in claim 1, wherein said means for determining the apparent affective state of the user comprises a means responsive to the facial expressions of the user.

3. An information system under affective control as in claim 1, wherein said means for determining the apparent affective state of the user comprises a means responsive to content of said user input.

4. An information system under affective control as in claim 1, wherein said application program is a program for transmission to others of text composed by the user.

5. An information system under affective control as in claim 1, wherein the means for determining the apparent affective state of the user comprises means for analyzing aspects of speech of the user.

6. An information system under affective control as in claim 5, wherein the means for analyzing aspects of speech includes means for measuring the timing of utterance of the voice of the user.

7. An information system under affective control as in claim 5, wherein the means for analyzing aspects of speech includes means for measuring the quality of the voice of the user.

8. An information system under affective control as in claim 5, wherein the means for analyzing aspects of speech includes means for measuring the utterance pitch contour of the voice of the user.

9. An information system under affective control as in claim 1, wherein the means for determining the apparent affective state of the user comprises means for measuring autonomic responses of the user.

10. An information system under affective control as in claim 9, wherein the means for measuring autonomic responses of the user comprises means for measuring characteristics of the skin of the user.

11. An information system under affective control as in claim 9, wherein the means for measuring autonomic responses of the user comprises means for measuring characteristics of the eye of the user.

12. An information system under affective control as in claim 11, wherein the means for measuring characteristics of the eye of the user measures dilation of the eye of the user.

13. An information system under affective control as in claim 11, wherein the means for measuring characteristics of the eye of the user measures a rate at which the user blinks the eye.

14. An information system under affective control as in claim 1, wherein the means for determining the apparent affective state of the user comprises means for analyzing facial expressions of the user.

15. An information system under affective control as in claim 14, wherein the means for analyzing facial expressions of the user comprises a video camera.

16. An information system under affective control as in claim 1, wherein the means for determining the apparent affective state of the user comprises means for analyzing gestures of the user.

17. An information system under affective control as in claim 1, wherein the means for determining the apparent affective state of the user comprises means for detecting marking by the user of text entered by the user.

18. An information system under affective control as in claim 1, wherein said application program comprises an email composition program, and said means for determining the apparent affective state of the user comprises means for analyzing a quantity of recipients of an email message being composed using said email composition program.

19. An information system under affective control as in claim 1, wherein said application program comprises an email composition program, and said means for determining the apparent affective state of the user comprises means for analyzing content of an email message being composed using said email composition program.

20. An information system under affective control as in claim 1, wherein said application program comprises an email composition program, and said means for determining the apparent affective state of the user comprises means for analyzing the time elapsed between presenting a received message to the user and receiving from the user a proposed response to the received message.

21. A method of processing text indicating the emotional state of the writer at the time of writing, comprising the steps of:
  (a) accepting text input from the writer;
  (b) determining the apparent emotional state of the writer;
  (c) marking the appearance of at least a portion of the text accepted from the writer if the apparent emotional state of the writer indicates that the text should be marked; and
  (d) outputting marked text, thereby indicating the apparent emotional state of the writer.

22. The method of processing text as set forth in claim 21, wherein said step of determining the apparent emotional state of the writer is performed by monitoring at least one of the writer's text input characteristics, text content, writer autonomic indicators and the facial expressions of the writer.

23. The method of processing text as set forth in claim 21, wherein said step of accepting text input from the writer comprises receiving text manually input by the writer into a text input device and said step of determining the apparent emotional state of the writer is performed at least in part by determining the force used by the writer in manually inputting text into the input device.

24. An information system, comprising:
  an application program for engaging by a user;
  means for monitoring factors relating to an emotional state of the user; and
  means for changing the operation of the application program responsive to the emotional state of the user;
  wherein said means for changing the operation of the application program comprises means for changing the appearance of text input by the user if the apparent affective state of the user indicates that the text input by the user should be marked.

25. The information system of claim 24 wherein the means for monitoring the factors relating to the emotional state of the user includes means for monitoring characteristics of text inputted into the application program by the user.

26. The information system of claim 25 wherein the means for monitoring characteristics of text inputted includes means for monitoring appearance characteristics of the inputted text indicating the emotional state of the user.

27. The information system of claim 24 wherein the means for monitoring the factors relating to the emotional state of the user includes means for monitoring characteristics of creation of a document by the text inputted by the user.

28. The information system of claim 24 wherein the means for monitoring the factors relating to the emotional state of the user includes means for monitoring characteristics of the user as the user inputs text into the application program.

29. The information system of claim 28 wherein the means for monitoring characteristics of the user includes means for monitoring a degree of force exerted by the user on a manual input device as the user inputs text.

30. An information system under affective control comprising:
  an application program with which a user is actively engaged;
  means for determining the apparent affective state of the user; and
  means for changing the operation of the application program responsive to the apparent affective state of the user;
  wherein the means for determining the apparent affective state of the user comprises a manual input device capable of measuring a degree of force applied by the user to the manual input device;
  wherein the manual input device comprises a keyboard capable of measuring a degree of force applied by the user to a key on the keyboard.

31. An information system under affective control comprising:
  an application program with which a user is actively engaged;

means for determining the apparent affective state of the user; and means for changing the operation of the application program responsive to the apparent affective state of the user;

wherein the means for determining the apparent affective state of the user comprises a manual input device capable of measuring degree of force applied by the user to the manual input device;

wherein the manual input device comprises a computer mouse capable of measuring a degree of force applied by the user to a button on the mouse.

* * * * *